(12) United States Patent
Nada et al.

(10) Patent No.: US 9,364,898 B2
(45) Date of Patent: Jun. 14, 2016

(54) CUTTING INSERT (75) Inventors: Yutaka Nada, Joso (JP); Osamu Ichinoseki, Joso (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 194 days.

(21) Appl. No.: 13/885,232

(22) PCT Filed: Nov. 15, 2011

(86) PCT No.: PCT/JP2011/076305
§ 371 (c)(1),
(2), (4) Date: May 14, 2013

(87) PCT Pub. No.: WO2012/067114
PCT Pub. Date: May 24, 2012

(65) Prior Publication Data
US 2013/0236258 A1 Sep. 12, 2013

(30) Foreign Application Priority Data

Nov. 15, 2010 (JP) .................. 2010-254999
Nov. 10, 2011 (JP) .................. 2011-246397

(51) Int. Cl.
*B23B 27/22* (2006.01)
*B23B 27/16* (2006.01)
*B23B 27/14* (2006.01)
*B23C 5/02* (2006.01)

(52) U.S. Cl.
CPC ........... *B23B 27/1607* (2013.01); *B23B 27/141* (2013.01); *B23B 2200/0447* (2013.01); *B23B 2200/0452* (2013.01); *B23B 2200/081* (2013.01); *B23B 2200/085* (2013.01); *B23B 2200/201* (2013.01); *B23B 2200/202* (2013.01); *B23B2200/242* (2013.01); *B23B 2200/286* (2013.01); *Y10T 407/235* (2015.01)

(58) Field of Classification Search
CPC  B23B 27/143; B23B 27/145; B23B 220/081; B23B 220/087; B23C 220/081; B23C 220/087
See application file for complete search history.

(56) References Cited

U.S. PATENT DOCUMENTS 4,915,548 A * 4/1990 Fouquer et al. ............... 407/114
4,940,369 A    7/1990 Aebi et al.
6,065,907 A    5/2000 Ghosh et al.
(Continued)

FOREIGN PATENT DOCUMENTS

JP  63-042965 Y  11/1988
JP  06-190612 A   7/1994
(Continued)

OTHER PUBLICATIONS

International Search Report dated Jan. 17, 2012, issued for PCT/JP2011/076305 and English translation thereof.
(Continued)

*Primary Examiner* — Will Fridie, Jr.
(74) *Attorney, Agent, or Firm* — Locke Lord LLP (57) ABSTRACT

The present invention relates to the cutting insert having a cutting edge which has a corner section that forms a convex arc shape when seen in a planar view from direction facing the rake face and a linear section that is in contact with the corner section at least at one end of the corner section and extends linearly. The cutting edge is provided with a first region along the corner section when seen in a planar view a second region along the linear section and a third region between the first region and the second region. A rake angle of the cutting edge in the third region is made greater than rake angles of the cutting edges in the first region and the second region.

12 Claims, 10 Drawing Sheets

(56) References Cited

U.S. PATENT DOCUMENTS

| | | | |
|---|---|---|---|
| 2009/0226269 A1* | 9/2009 | Iyori et al. | 407/114 |
| 2011/0070039 A1* | 3/2011 | Park et al. | 407/113 |

FOREIGN PATENT DOCUMENTS

| | | |
|---|---|---|
| JP | 08-118112 A | 5/1996 |
| JP | 08-505817 A | 6/1996 |
| JP | 2001-038507 A | 2/2001 |
| JP | 2001-157903 A | 6/2001 |
| JP | 2002-066812 A | 3/2002 |
| JP | 2007-175788 A | 7/2007 |
| WO | WO-94/16851 A1 | 8/1994 |
| WO | WO 03043767 A1 * | 5/2003 |
| WO | WO-2009/096516 A1 | 8/2009 |

OTHER PUBLICATIONS

Supplementary European Search Report mailed Jan. 28, 2016, issued for the European patent application No. 11840956.4.

* cited by examiner

CUTTING INSERT

CROSS REFERENCE TO RELATED APPLICATIONS

This application is related to co-pending application, entitled, "CUTTING INSERT" filed concurrently herewith in the names of Yutaka Nada and Osamu Ichinoseki as a national stage application of International Application No. PCT/JP2011/076274, filed Nov. 15, 2011, which application is assigned to the assignee of the instant application and which co-pending application is also incorporated by reference herein.

TECHNICAL FIELD

The present invention relates to a cutting insert which is appropriately used in light cutting for turning a difficult-to-cut material such as stainless steel.

Priority is claimed on Japanese Patent Application No. 2010-254999 filed on Nov. 15, 2010 in Japan and Japanese Patent Application No, 2011-246397 filed on Nov. 10, 2011 in Japan, the content of which is incorporated herein by reference.

BACKGROUND ART

Patent Document 1 has described such a problem that burrs will occur easily upon cutting these difficult-to-cut materials such as stainless steel, these burrs undergo work hardening to result in extremely low machinability and, therefore, a cutting edge of a cutting boundary which is exposed to the burrs is increased in chipping to fracture the cutting edge or greatly decrease the tool life due to what is called abnormal wear.

Therefore, Patent Document 1 proposes a cutting insert in which a cutting edge is formed substantially linearly at an inclination angle which is greater than 0° but smaller than 20° so that a distance of the cutting edge from a bottom face of a flat insert main body is small at a corner section and gradually increases as moving toward the center of the cutting edge, a breaker rake face of a chip breaker on an upper face is set at an angle of 20 to 30° and there is formed at an inner part of the breaker rake face a breaker wall which rises in a direction at which the height of the bottom face is gradually increased from a bottom of the chip breaker toward the inner part thereof, by which an upper face part inside the chip breaker is made lower than a peripheral cutting edge section.

According to the above-described cutting insert, it is possible to reduce the occurrence of burrs even where the cutting edge is increased in inclination angle to cut a difficult-to-cut material such as stainless steel. Further, abnormal wear can be suppressed as much as possible to extend the tool life. Furthermore, what is called tenacious chips coming from a difficult-to-cut material can be broken into pieces reliably by the breaker wall of the chip breaker. Still further, even where the chips move along the breaker wall, resistance associated with the movement thereof can be reduced to prevent heating.

Further, Patent Document 2 proposes a cutting insert which is used appropriately in cutting stainless steel, that is, a breaker flute is formed to have a cross section which is constituted with a land (rake angle $\theta 1$), a first inclination face (rake angle $\theta 2$), a second inclination face (rake angle $\theta 3$) and a steep face, each of which has a positive rake angle sequentially from a cutting edge to a center so as to give the relationship of $\theta 2 > \theta 1 \geq \theta 3 > 0$, and the rake angle $\theta 1$ of the land is increased at the corner but decreased at the center of a major cutting edge, while the width of the land is decreased at the corner but increased at the center of the major cutting edge.

According to Patent Document 2, since the contact area between the breaker flute and the chips is small, the thus constituted cutting insert can suppress cutting resistance. Further, since a position of the cutting edge corresponding to the depth of cut where fracturing will take place easily is strengthened, the position is to be high in fracturing resistance. Next, Patent Document 2 describes that the above-described result has been obtained in particular when the thus constituted cutting insert is used to perform light cutting of stainless steel (SUS304) under conditions that the cutting speed is 100 m/min, the depth of cut is 1 mm and the feed rate is 0.2 mm/rev.

PRIOR ART DOCUMENTS

Patent Documents

Patent Document 1: Japanese Published Examined Utility Model Application No. S63-42965

Patent Document 2: Japanese Published Unexamined Patent Application No. 2001-38507

SUMMARY OF THE INVENTION

Problems to be Solved by the Invention

As described in the cutting insert of Patent Document 1, when the breaker rake face of the chip breaker is increased in angle, that is, a practical rake angle of the cutting edge is increased up to 20 to 30° all over a circumference thereof, the cutting edge is improved in sharpness to suppress the occurrence of burrs. However, the cutting edge is decreased in strength and thereby chipping and fracturing are more likely to occur.

On the other hand, as described in the cutting insert of Patent Document 2, when the rake angle of the land is decreased at the center of the major cutting edge and the width of the land is increased in order to strengthen the cutting edge at a position corresponding to the depth of cut, it is possible to improve the fracturing resistance. However, the cutting insert is decreased in sharpness at a cutting boundary thereby burrs more likely to occur and the cutting insert is further decreased in sharpness due to abnormal wear thereby burrs more likely to occur, which results in a negative circle.

The present invention has been made in view of the above situation, an object of which is to provide a cutting insert which is capable of suppressing an undue decrease in the strength of a cutting edge on light cutting of a difficult-to-cut material such as stainless steel to ensure fracturing resistance and chipping resistance and also capable of suppressing the occurrence of burrs at a cutting boundary, thereby preventing abnormal wear.

Means for Solving the Problems

The cutting insert of the present invention is provided with an insert main body having a rake face and a flank face and a cutting edge formed at a ridge section between the rake face and the flank face in the insert main body. The cutting edge is provided with a corner section which forms a convex arc shape when seen in a planar view from a direction facing the rake face and a linear section which is in contact with the corner section at least at one end of the corner section and extends linearly. The cutting edge is provided with a first region along the corner section when seen in the planar view, a second region along the linear section and a third region positioned between the first region and the second region. A rake angle of the cutting edge in the third region is greater than rake angles of the cutting edges in the first region and the second region.

In the above-constituted cutting insert, the third region of the cutting edge is disposed at a cutting boundary when light cutting is performed by a turning process. Thereby, the cutting edge is increased in sharpness at the cutting boundary to suppress the occurrence of burrs, thus making it possible to prevent progress of abnormal wear due to the burrs. On the other hand, in the first region and the second region other than the third region, the cutting edge is smaller in rake angle but inversely greater in wedge angle, thus making it possible to increase the strength of the cutting edge. It is therefore possible to ensure the fracturing resistance and chipping resistance and extend the insert life.

In light cutting generally performed under conditions that the depth of cut is 0.5 to 1.5 mm and the feed rate is 0.1 to 0.3 mm/rev, the third region of the cutting edge is to be more reliably disposed in a range which includes the cutting boundary. For this purpose, when the rake angle of the cutting edge gradually decreases from borders of the third region, which are between the third region and the first region and between the third region and the second region, toward the first and the second regions along the respective cutting edges in the first and the second regions, it is acceptable that the border between the third region and the first region is positioned in a range of R×3/8 to R×3/4 (mm) with respect to a radius R (mm) of the corner section from a tangent line which is orthogonal to an extension line of the linear section to the corner section and in contact with the corner section, along the extension line, when seen in the planar view, and the border between the third region and the second region is in a range of R×3/2 to R×15/8 (mm) with respect to the radius R (mm) of the corner section from the tangent line, along the extension line, when seen in the planar view. It is also acceptable that the third region is positioned in a range of R×3/4 to R×3/2 (mm) with respect to the radius R (mm) of the corner section from the tangent line which is orthogonal to the extension line of the linear section to the corner section and in contact with the corner section, along the extension line, when seen in the planar view. That is, it is acceptable that the border between the third region and the first regions and the border between the third region and the second region at which a rake angle is sequentially decreased to the first region and the second region from the third region having a greater rake angle are disposed at the position of R×3/4 (mm) and the position of R×3/2 (mm).

Further, as with the first inclination face and the second inclination face of Patent Document 2, it is acceptable that a positive rake face which is on the side of the cutting edge and forms the rake angle and a flat rake face which is inside the positive rake face and smaller in rake angle than the positive rake face are included in the rake face, and the width of the positive rake face in a direction orthogonal to the cutting edge in the third region is the smallest among the regions when seen in the planar view. It is thereby possible to prevent fracturing of the cutting edge in the third region having a greater rake angle. On the other hand, it is acceptable that the cutting edge included in the third region is curved between the first and second regions so as to put a dent in the rake face when seen in a side view facing the flank face. Thereby, the cutting edge can be further improved in sharpness in the third region to suppress the occurrence of burrs more reliably.

Effects of the Invention

As described so far, according to the present invention, it is possible to prevent the fracturing and chipping of the cutting edge on light cutting of a difficult-to-cut material such as stainless steel and also improve sharpness of the cutting edge at a cutting boundary to suppress the occurrence of burrs. It is also possible to prevent abnormal wear and perform a stable and efficient turning process.

BEST MODE FOR CARRYING OUT THE INVENTION

One embodiment of the present invention is shown in FIG. 1 to FIG. 21. In the present embodiment, an insert main body 1 is formed as a flat polygonal plate with a hard material such as a sintered hard alloy, a pair of polygonal faces are given as rake faces 2 and side faces around the rake faces 2 are given as flank faces 3. Further, an attachment hole 4 for attaching the insert main body 1 to a holder of a indexable tool is formed on the insert main body 1 so as to go through the insert main body 1 in a thickness direction thereof (in a vertical direction in FIG. 3, FIG. 4, FIG. 6 to FIG. 11, and FIG. 13 to FIG. 21) and opened at the center of the rake face 2. In addition, a metal oxide layer such as $Al_2O_3$ or a carbon-nitride layer such as TiCN may be coated on the surface of the insert main body 1 in a singular or a multi-layered form. It is also possible to coat a diamond layer thereon.

Further, a ridge section between adjacent flank faces 3 is formed in a shape of a raised cylindrical face which is smoothly in contact with the flank faces 3 and a cutting edge 5 is formed at a ridge section between the flank faces 3 and the rake face 2. Therefore, the cutting edge 5 is provided with a corner section 6 formed as a convex arc shape at a ridge section between the adjacent flank faces 3 when seen in a planar view from the thickness direction facing the rake face 2 (when seen in a planar view along the center line of the attachment hole 4). The present embodiment is also provided with a pair of linear sections 7 which are in contact with the corner section 6 at both ends of the corner section 6 and extend linearly, Still further, the cutting insert of the present embodiment is given as a negative type insert in which the flank face 3 extends in the above-described thickness direction and is devoid of a relief angle.

Figure 5:
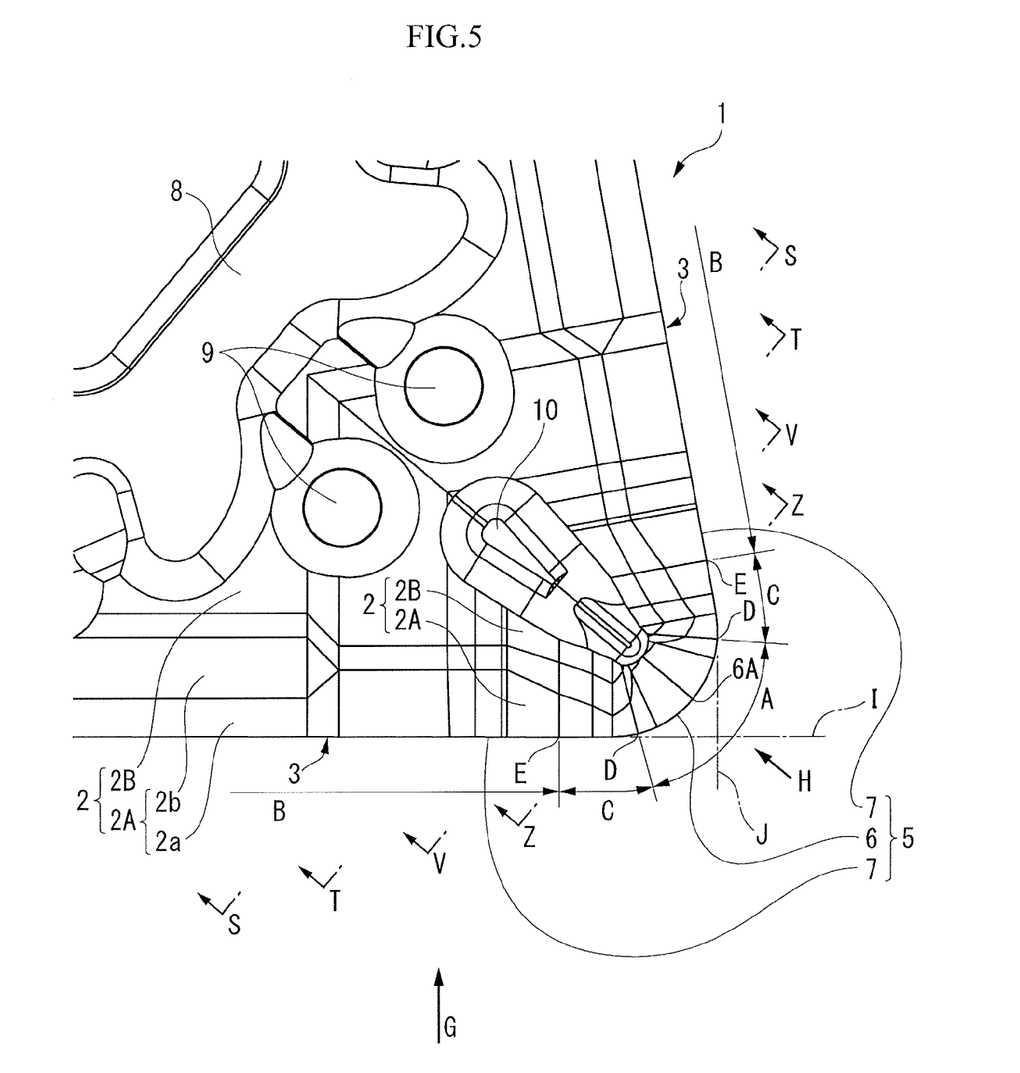
FIG. 5 is a first enlarged planar view which shows the vicinity of a corner section of a cutting edge of the embodiment shown in FIG. 1 when seen in a direction facing the rake face.
Figure 12:
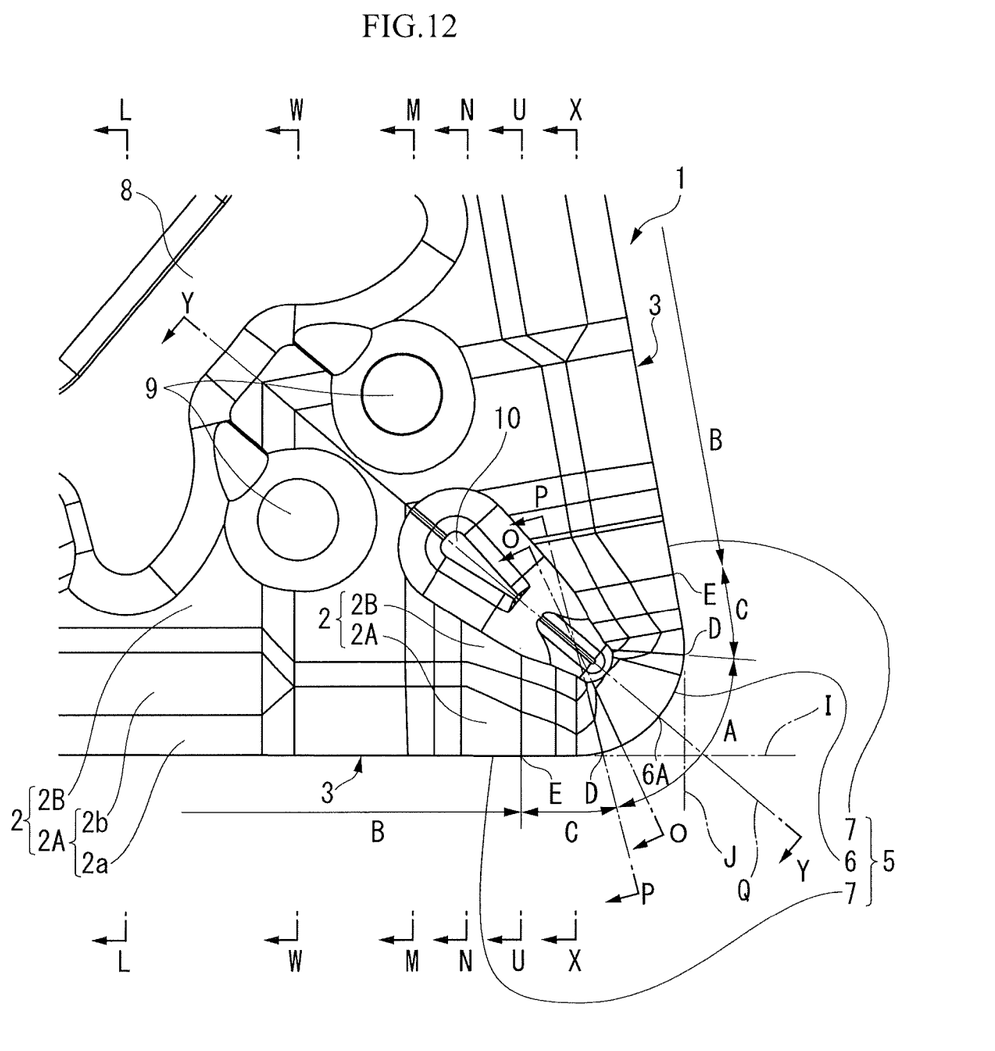
FIG. 12 is a second enlarged planar view which shows the vicinity of the corner section of the cutting edge of the embodiment shown in FIG. 1 when seen from a direction facing the rake face.

Here, the insert main body 1 of the present embodiment is formed as a flat rhomboid plate and a pair of rhomboid faces is given as rake faces 2. Therefore, the corner section 6 of the cutting edge 5 is such that the one formed at a rhomboid acute-angled corner and the one formed at an obtuse-angled corner by the rake faces 2 are alternately placed in a circumferential direction. In the above-described cutting insert, as shown in FIG. 5 and FIG. 12, the corner section 6 formed at the acute-angled corner and the linear sections 7 continuous thereto are mainly used in turning a workpiece. However, in a flat square cutting insert, it is possible to use corner sections formed at four right angle corners and linear sections continuous thereto.

In addition, a boss section 8 which protrudes so as to rise in the thickness direction from the rake face 2 is formed around an opening section of the attachment hole 4 at the center of the rake face 2. Here, an upper face of the boss section 8 is at a position which protrudes in the thickness direction to a slightly greater extent than the cutting edge 5 on each of the rake faces 2 and given as a flat plane perpendicular to the thickness direction. Further, a side face of the boss section 8 intersects with an upper face obtusely and is given as an inclination face which becomes wider when moving from the upper face toward the rake face 2.

Further, at a part which is close to the boss section 8 between the acute-angled corner and the boss section 8, on both sides of a diagonal line connecting the rhomboid acute-angled corners formed by the rake face 2, that is, on both sides of a bisector Q of the corner section 6 at the acute-angled corner, a pair of protruded sections 9 in the shape of a circular truncated cone are formed so as to rise and protrude from the rake face 2. An upper face of each of the protruded sections 9 is also at the same position as the upper face of the boss section 8 in the thickness direction and given as a flat plane perpendicular to the thickness direction. Further, in the present embodiment, the insert main body 1 is formed so as to be symmetrical with respect to the bisector Q when seen in the planar view and also symmetrical in the thickness direction and, therefore, the insert main body 1 has a shape of front/back-reversal symmetric.

Further, between the pair of protruded sections 9 and the corner section 6 of the cutting edge 5, a protrusion streak 10 which protrudes so as to rise from the rake face 2 is formed so as to extend along the bisector Q, with intervals kept between the protruded sections 9 and the corner section 6. The protrusion streak 10 is formed in such a manner that the width of the protrusion streak 10 when seen in the planar view is gradually increased as being spaced away from the corner section 6 along the bisector Q and the position of the protrusion streak 10 is raised in two stages in the thickness direction of the upper face thereof. However, the upper face of a higher stage is positioned lower than the boss section 8 and the upper faces of the protruded sections 9 in the thickness direction. Each of the upper faces of two stages of the protrusion streak 10 is also given as a flat plane perpendicular to the thickness direction and a side face thereof is given as an inclination face which becomes wider along the rake face 2. A ridge section between the upper face and the side face is chamfered to give a cross section which is in the shape of a convex arc.

On the other hand, the rake face 2 is provided on the side of the cutting edge 5 and communicates with the cutting edge 5 without a land or the like in the present embodiment, provided with a positive rake face 2A which is curved to be thin in the thickness direction as being spaced away from the cutting edge 5 on a cross section perpendicular to the cutting edge 5 when seen in the planar view, thereby giving a positive rake angle θ, and also provided with a flat rake face 2B which is inside the positive rake face 2A, giving a rake angle which is smaller than that of the positive rake face 2A and extending at the rake angle of 0°, that is, in a direction perpendicular to the thickness direction on the cross section in the present embodiment.

Figure 13:
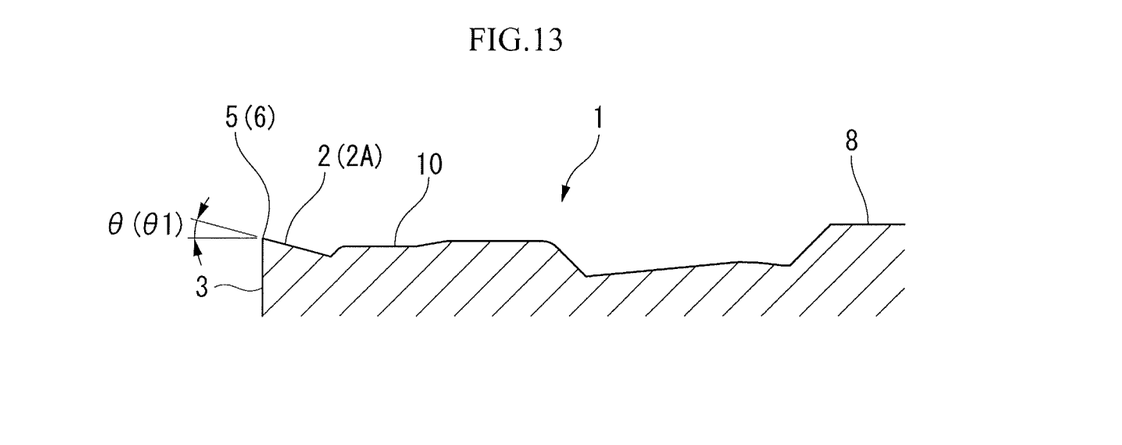
FIG. 13 is a sectional view taken along a line of Y to Y in FIG. 12 (a sectional view orthogonal to a cutting edge 5 when seen from a direction facing the rake face in a first region A).
Figure 14:
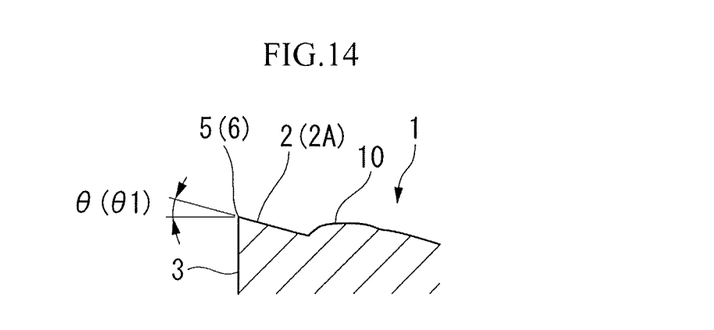
FIG. 14 is a sectional view which shows an O to O part in FIG. 12 (a sectional view orthogonal to the cutting edge 5 when seen from a direction facing the rake face in the first region A).
Figure 15:
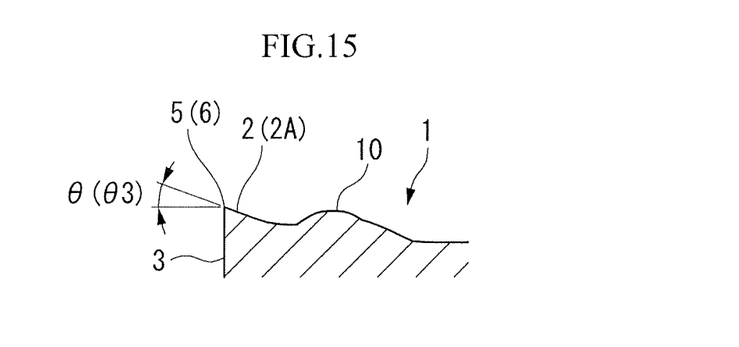
FIG. 15 is a sectional view which shows a P to P part in FIG. 12 (a sectional view orthogonal to the cutting edge 5 when seen from a direction facing the rake face in a third region C).
Figure 16:
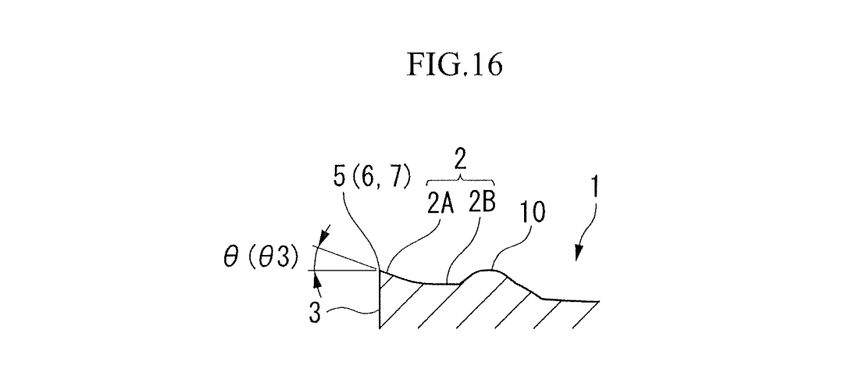
FIG. 16 is a sectional view which shows an X to X part in FIG. 12 (a sectional view orthogonal to the cutting edge 5 when seen in a direction facing the rake face in the third region C).
Figure 17:
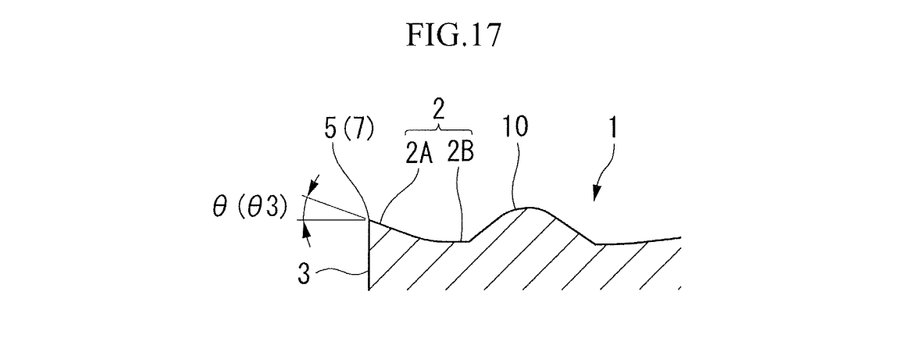
FIG. 17 is a sectional view which shows a U to U part in FIG. 12 (a sectional view orthogonal to the cutting edge 5 when seen from a direction facing the rake face in the third region C).
Figure 18:
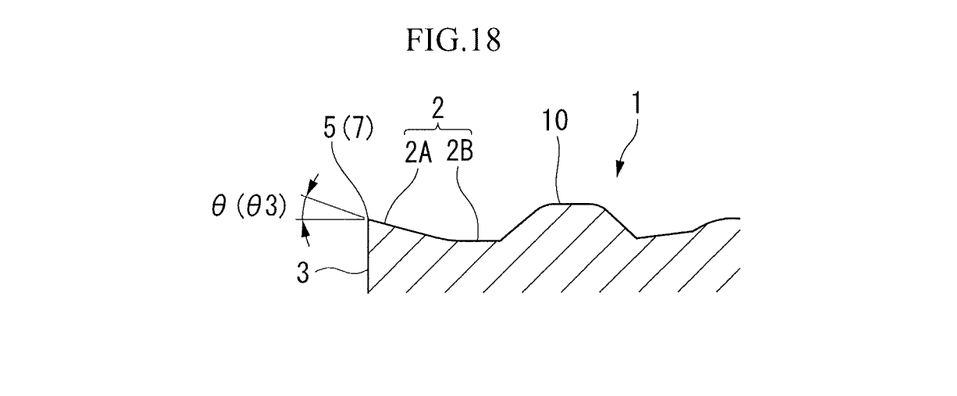
FIG. 18 is a sectional view which shows an N to N part in FIG. 12 (a sectional view orthogonal to the cutting edge 5 when seen from a direction facing the rake face in a second region B).
Figure 19:
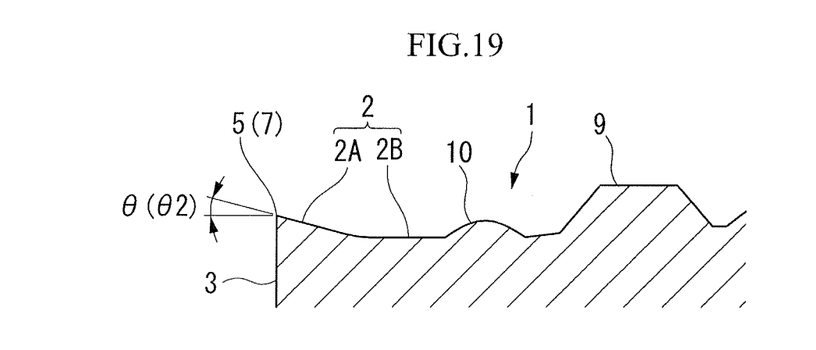
FIG. 19 is a sectional view which shows an M to M part in FIG. 12 (a sectional view orthogonal to the cutting edge 5 when seen from a direction facing the rake face in the second region B).
Figure 20:
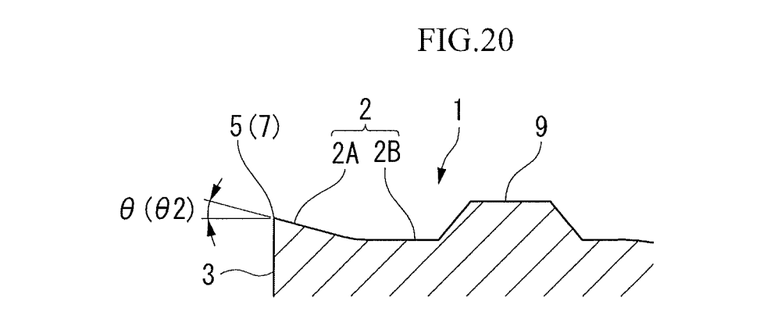
FIG. 20 is a sectional view which shows a W to W part in FIG. 12 (a sectional view orthogonal to the cutting edge 5 when seen from a direction facing the rake face in the second region B).
Figure 21:
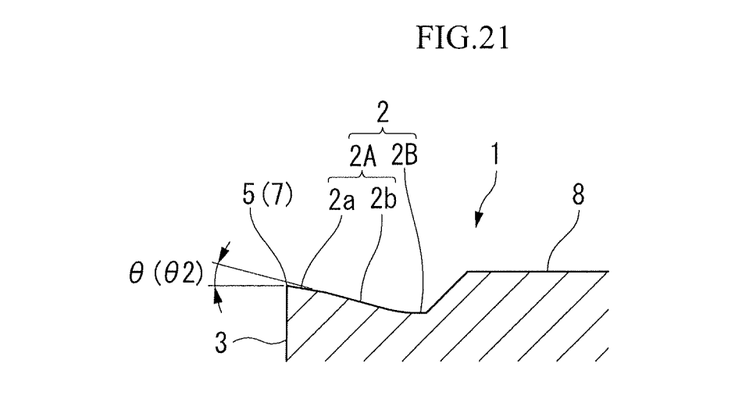
FIG. 21 is a sectional view which shows an L to L part in FIG. 12 (a sectional view orthogonal to the cutting edge 5 when seen from a direction facing the rake face in the second region B)

However, the protrusion streak 10 is provided in an extended manner on the bisector Q of the corner section 6 and in the vicinity thereof. Thereby, no flat rake face 2B is present as shown in FIG. 13 and FIG. 14, or the flat rake face 2B is made extremely small as shown in FIG. 15. Further, a space between the positive rake face 2A and the flat rake face 2B communicates with a recessed curved face more smoothly.

Next, regarding the cutting edge 5, as shown in FIG. 5 and FIG. 12 when seen in the planar view, on the assumption that a part along the corner section 6 is given as a first region A, a part along the linear section 7 is given as a second region B and a part between the first region A and the second region B is given as a third region C, a rake angle θ of the cutting edge 5 which is formed by the positive rake face 2A, that is, an inclination angle formed by the positive rake face 2A in a direction perpendicular to the thickness direction on a cross section orthogonal to the cutting edge 5 when seen in the planar view is such that a rake angle θ3 of the cutting edge 5 in the third region C is greater than rake angles θ1, θ2 of the cutting edges 5 in the first region A and the second region B.

Here, in the present embodiment, the rake angle θ3 is to be constant in the third region C and the rake angle θ gradually decreased from the border D between the third region C and the first region A and the border E between the third region C and the second region B toward the first and the second regions as being spaced away from the third region C along the cutting edges 5 in the first region A and the second region B. Next, in the first region A, the rake angle θ1 is to be constant at a part including a corner tip 6A on the bisector Q of the corner section 6 (a part from the corner tip 6A to a cross section O to O in FIG. 12). Furthermore, in the second region B, the rake angle θ2 is to be constant at a part which is a predetermined length on the side of the third region C (a part between a cross section N to N and a cross section W to W in FIG. 12).

Further, the rake angle θ3 which is made large in the third region C is desirably set in a range of 15 to 25°. Furthermore, the rake angles θ1, θ2 which are made smaller than 15 to 25° in the first region A and the second region B are desirably set smaller than the rake angle θ3 in a range of 10 to 20°.

In the present embodiment, the rake angles θ1, θ2 which are constant in the first region A and the second region B are set to be 15° and are set equal with each other. The rake angle θ3 in the third region C is to be 20°.

Further, in the present embodiment, as shown in FIG. 5 and FIG. 12 when seen in the planar view, in the first, the second and the third regions, A, B, C, the third region C is such that the border D between the third region C and the first region A and the border E between the third region C and the second region B are disposed at a position of R×¾ (mm) and a position of R×3/2 (mm) with respect to a radius R (mm) of the corner section 6 from a tangent line J which is orthogonal to an extension line I of the linear section 7 of the cutting edge 5 to the corner section 6 and in contact with the corner section 6, along the extension line I, when seen in the planar view, and the range of R×¾ (mm) to R×3/2 (mm) is given as the third region C. Therefore, in the present embodiment, the third region C is given as a region which includes a contact point between the corner section 6 and the linear section 7 at the cutting edge 5 (a position of a Z to Z cross section in FIG. 12). It is, however, acceptable that the border D between the third region C and the first region A is positioned in a range of R×⅜ (mm) to R×¾ (mm) with respect to the radius R (mm) from the tangent line J, along the extension line I, when seen in the planar view. It is also acceptable that the border E between the third region C and the second region B is positioned in a range of R×3/2 to R×15/8 (mm) with respect to the radius R (mm) from the tangent line J, along the extension line I, when seen in the planar view.

Further, when seen in the planar view, the width of the positive rake face 2A in a direction orthogonal to the cutting edge 5 is smallest in the third region C, as shown in FIG. 5 and FIG. 12. Here, in the present embodiment, the width of the positive rake face 2A in a direction orthogonal to the cutting edge 5 gradually decreases at a part where the rake angle is increased from θ1 to θ3 toward the border D between the third region C and the first region A in the first region A. Still further, the width of the positive rake face 2A also gradually decreases in the third region C beyond the border D toward the third region C so as to be spaced away from the first region A and becomes smallest at a contact point between the corner section 6 and the linear section 7 in the cutting edge 5.

Next, from the contact point to the second region B, the width of the positive rake face 2A is gradually increased beyond the border E between the second region B and the third region C up to a part where the rake angle is gradually decreased from θ3 to θ2. Furthermore, the width of the positive rake face 2A is also constant at a part where the rake angle θ2 is constant in the second region B. At a part opposite of the third region C from the part where the rake angle θ2 is constant in the second region B, the positive rake face 2A is provided in two stages made up of a first positive rake face 2a having a smaller rake angle (for example, 10°) than the rake angle θ2 on the side of the cutting edge 5 and a second positive rake face 2b which is inside of the first positive rake face 2a and has a rake angle θ2. A total width of the positive rake face 2A is greater than the width of the part where the rake angle θ2 is to be constant.

Figure 1:
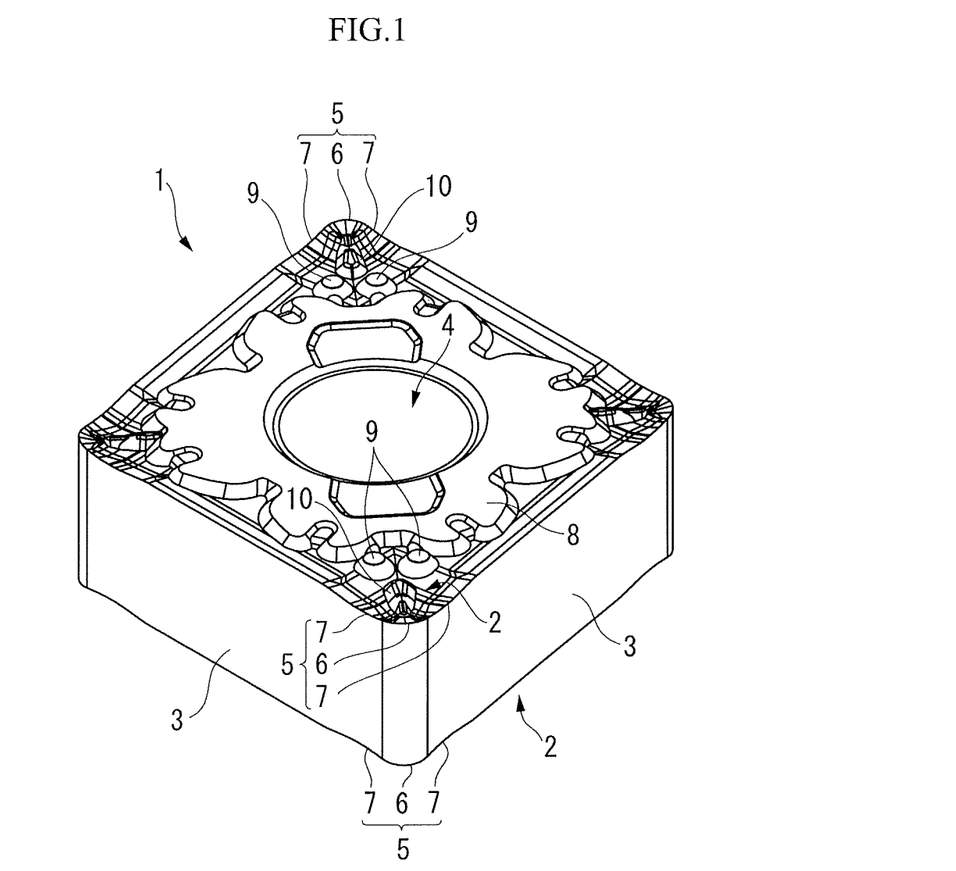
FIG. 1 is a perspective view which shows one embodiment of the present invention.
Figure 2:
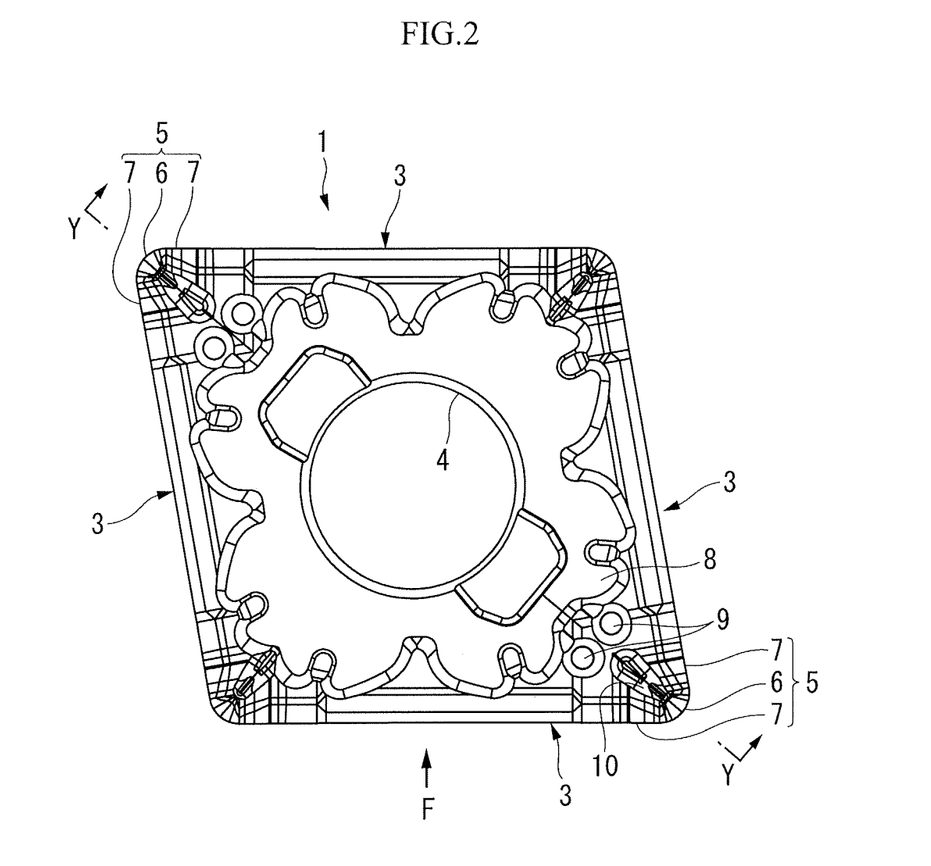
FIG. 2 is a planar view which shows the embodiment shown in FIG. 1 when seen in a direction facing a rake face.
Figure 3:
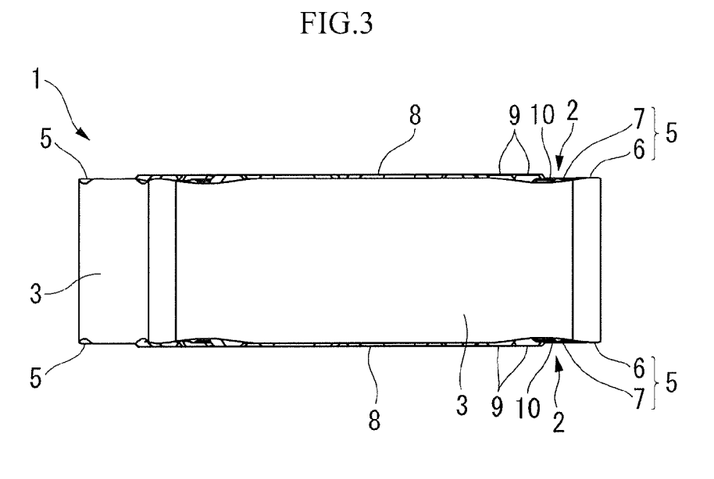
FIG. 3 is a side view which shows the embodiment shown in FIG. 2 when seen in a direction of an arrow F.
Figure 4:
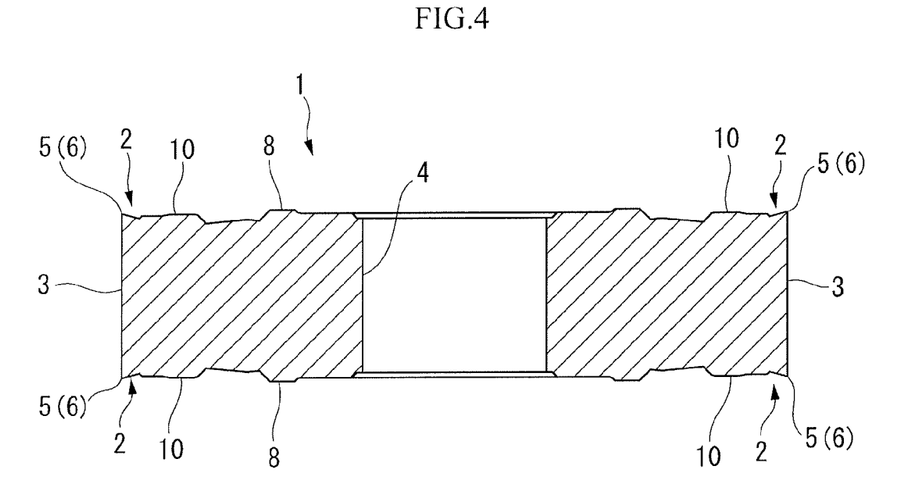
FIG. 4 is a sectional view taken along a line of Y to Y in FIG. 2.
Figure 6:
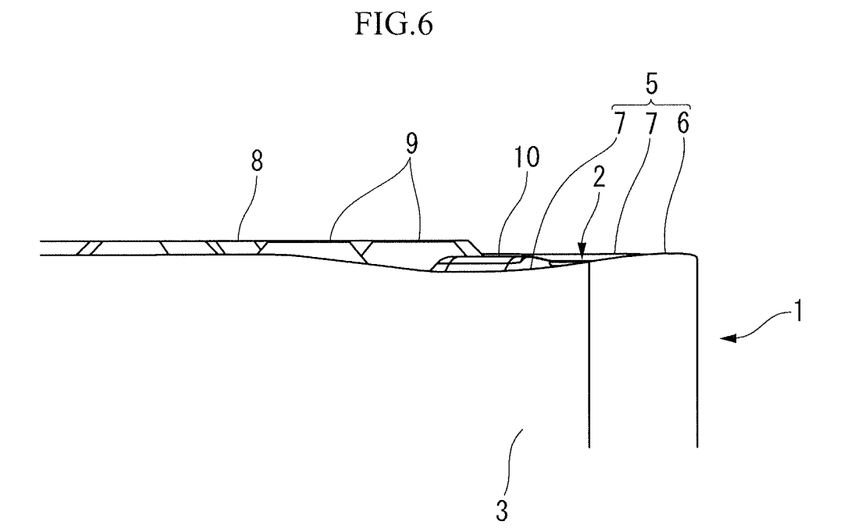
FIG. 6 is a side view when seen in a direction of an arrow G in FIG. 5.
Figure 7:
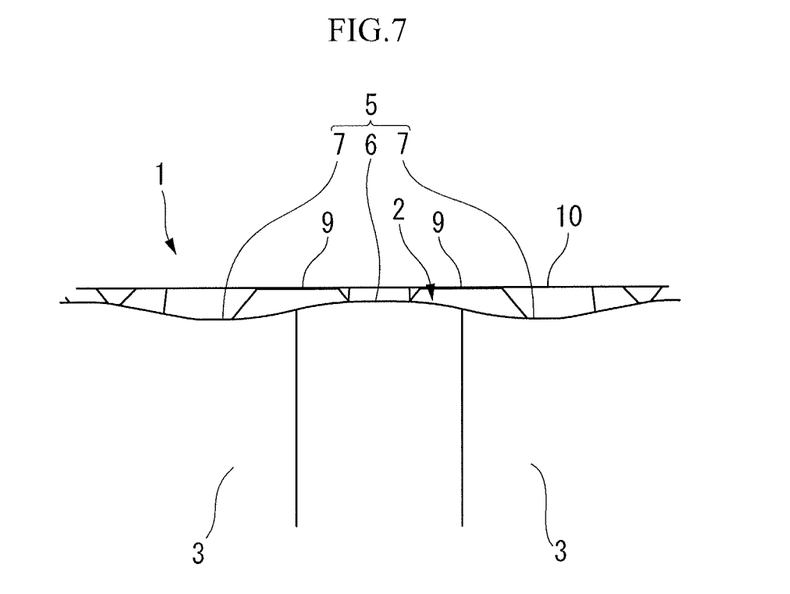
FIG. 7 is a side view when seen in a direction of an arrow H in FIG. 5.
Figure 8:
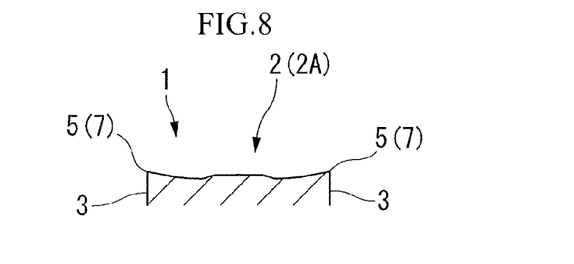
FIG. 8 is a sectional view taken along a line of Z to Z in FIG. 5.
Figure 9:
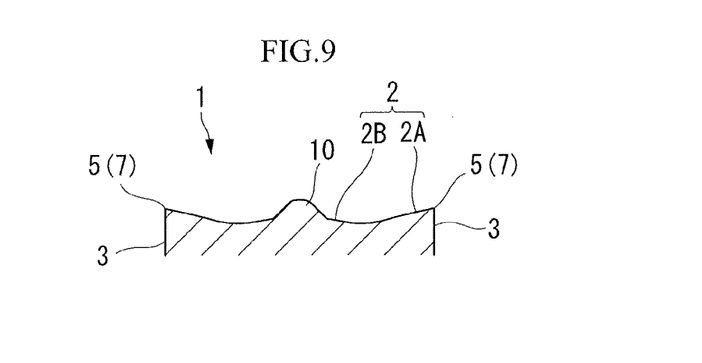
FIG. 9 is a sectional view taken along a line of V to V in FIG. 5.
Figure 10:
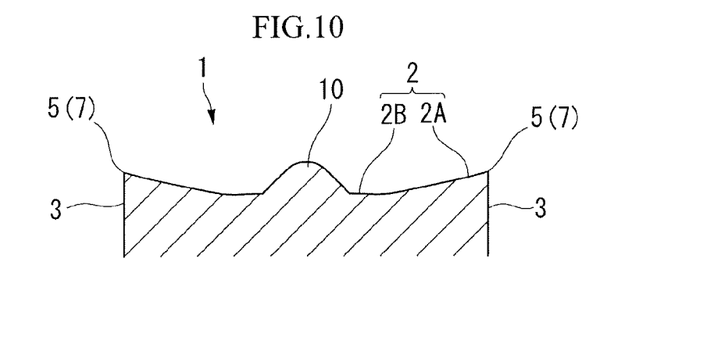
FIG. 10 is a sectional view taken along a line of T to T in FIG. 5.
Figure 11:
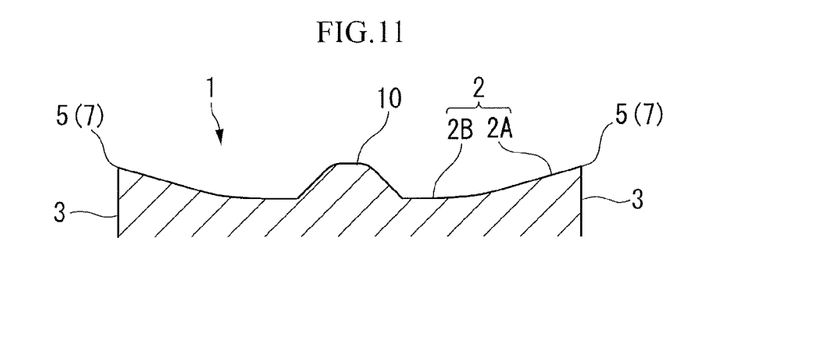
FIG. 11 is a sectional view taken along a line of S to S in FIG. 5.

On the other hand, when seen in a side view facing the flank face 3, as shown in FIG. 3, FIG. 6 and FIG. 7, in the present embodiment, the cutting edge 5 is curved so as to put a dent in the thickness direction from the corner tip 6A of the corner section 6 through the border D between the first region A and the third region C and the border E between the second region B and the third region C up to a part where the rake angle θ2 starts to be constant in the second region B. Therefore, the cutting edge 5 is curved so as to put a dent in the thickness direction as moving toward the second region B from the first region A all over in the third region C.

Here, when seen in the above side view, the cutting edge 5 is curved by giving a raised curve that rises in the thickness direction from the corner tip 6A to the contact point between the corner section 6 and the linear section 7. On the other hand, the cutting edge 5 is curved so as to put a dent in the thickness direction by giving a recessed curve smoothly communicating with the raised curve from the contact point. That is, the cutting edge 5 is formed as a recessed and raised curve having an inflexion point in the third region C.

The cutting edge 5 which dents in the thickness direction as described above is inclined upward so as to rise linearly in the thickness direction after giving a recessed curve as moving toward the opposite side of the third region C at the part where the rake angle θ2 is constant in the second region B. Furthermore, the cutting edge 5 extends on a flat plane perpendicular to the thickness direction via a raised curve at a part changing from the part where the rake angle θ2 is constant to a part where the positive rake face 2A is constituted with the first positive rake face 2a and the second positive rake face 2b. Further, a position of the thickness direction on the flat plane where the cutting edge 5 extends is made equal to a position of the cutting edge 5 at the corner tip 6A, which is lower than upper faces of the boss section 8 and the protruded section 9 but slightly higher than an upper face of the higher stage of the protrusion streak 10.

Further, the cutting edge 5 is curved and changes in such a manner that the width of the positive rake face 2A where the rake angle θ3 is to be constant when seen in the planar view becomes smallest in the third region C, as described above. Thereby, in the present embodiment, the flat rake face 2B extending inside the positive rake face 2A is such that the position of the thickness direction on a cross section orthogonal to the cutting edge 5 when seen in the planar view is also inclined downward so as to be gradually lower along the cutting edge 5 from the contact point between the corner section 6 and the linear section 7 where the width of the positive rake face 2A becomes smallest toward the part where the rake angle θ2 starts to be constant in the second region B where the position of the thickness direction of the cutting edge 5 is lowest. Further, the depth of the thickness direction from the cutting edge 5 on the cross section is gradually increased.

On the other hand, the flat rake face 2B in which the position of the thickness direction is lowered at the part where the rake angle θ2 of the second region B starts to be constant is such that the width of the positive rake face 2A is constant at the part where the rake angle θ2 is to be constant and the cutting edge 5 is inclined upward so as to rise in the thickness direction as moving toward the opposite side of the third region C. Thereby, when seen in the planar view, the position of the thickness direction on the cross section orthogonal to the cutting edge 5 is also inclined so as to gradually rise as moving toward the opposite side of the third region C along the cutting edge 5.

Up to the contact point between the corner section 6 and the linear section 7 in the third region C from the first region A, the flat rake face 2B is such that the position of the thickness direction (height) thereof is made equal in a direction along the cutting edge 5 and in the present embodiment given as a flat plane perpendicular to the thickness direction. Further, the width of the flat rake face 2B formed in between from the positive rake face 2A to the protrusion streak 10 via the recessed curved face in a direction orthogonal to the cutting edge 5 when seen in the planar view is substantially constant at a part where the flat rake face 2B is inclined downward (a part where the positive rake face 2A is gradually increased in width) as shown in FIG. 5 and FIG. 12.

In the turning process using the above-described cutting insert, the linear section 7 extending from the corner section 6 of the cutting edge 5 which has cut into a workpiece to a feeding direction of the corner section 6 cuts into the workpiece. In general, where a workpiece is subjected to light cutting under conditions that the depth of cut is 0.5 to 1.5 mm and the feed rate is 0.1 to 0.3 mm/rev, at the cutting edge 5 which cuts into the workpiece, a position of the tangent line J which is orthogonal to the extension line I of the linear section 7 to the corner section 6 and in contact with the corner section 6 is practically a tip of the depth of cut of the cutting edge 5. A cutting boundary is substantially positioned in a range of R×¾ to R×3/2 (mm) with respect to the radius R (mm) of the corner section 6 in the linear section 7 from the tangent line J, along the extension line I.

Next, in the above-described range, the cutting edge 5 is given as the third region of which the rake angle θ3 is smaller than the rake angle θ1 of the first region A and the rake angle θ2 of the second region B and imparted excellent sharpness. The thus described third region C is positioned at a cutting boundary, by which, for example, when a difficult-to-cut material such as stainless steel is subjected to turning, occurrence of burrs can be suppressed at the cutting boundary. Therefore, it is possible to avoid such a negative circle in that the cutting edge 5 cuts into the burrs which have undergone work hardening in association with feeding and abnormal wear of the cutting edge 5 proceeds and the cutting edge 5 is thereby decreased in sharpness with burrs more likely to occur. It is thus possible to perform stable and efficient light cutting.

On the other hand, in the first region A and the second region B other than the third region C, the rake angles θ1, θ2 of the cutting edges 5 are made smaller than the rake angle θ3 in the third region C. Thereby, these cutting edges 5 can be inversely increased in wedge angle to have a great cutting edge strength. Therefore, the cutting edge 5 as a whole retains sufficient fracturing resistance and chipping resistance and reduction in insert life due to the fracturing and the chipping is also prevented, by which it is possible to provide a cutting insert longer in service life.

Further, in the cutting insert of the present embodiment, the rake face 2 is provided with the positive rake face 2A which is on the side of the cutting edge 5 and gives the rake angles θ (θ1 to θ3) in the first, the second and the third regions A, B, C and the flat rake face 2B which is inside of the positive rake face 2A and gives a rake angle smaller than the rake angles θ of the positive rake face 2A or giving a rake angle of 0° in particular in the present embodiment. In the third region C having a greater rake angle θ3, the width thereof in a direction orthogonal to the cutting edge 5 of the positive rake face 2A when seen in a planar view from the direction facing the rake face 2 along the thickness direction is made smallest. In other words, the flat rake face 2B having a smaller rake angle is in a position closest to the cutting edge 5.

Therefore, according to the present embodiment, in the third region C in which the greater rake angle θ3 is likely to increase sharpness but impair strength and rigidity of the cutting edge 5, the flat rake face 2B having a smaller rake angle is brought close to the cutting edge 5, by which the insert main body 1 can be increased in thickness at a position close to the cutting edge 5. Thus, what is called back metal can be ensured to prevent the cutting edge 5 from being unnecessarily reduced in strength and rigidity. On the other hand, in the first region A and the second region B, the positive rake face 2A has a large width, and the flat rake face 2B having a smaller rake angle than the rake angles θ1, θ2 which are smaller than the rake angle θ3 and the protrusion streak 10 are kept away from the cutting edge 5. Thus, there is no chance that the cutting force is unnecessarily increased.

In the present embodiment, the rake angle of the flat rake face 2B on a cross section orthogonal to the cutting edge 5 when seen in the planar view is given as 0° and extends perpendicularly in the thickness direction of the insert main body 1. However, if smaller than the rake angle θ3 of the cutting edge 5 by the positive rake face 2A in the third region C, it is acceptable that the flat rake face 2B is not necessarily flat in a strict sense and, as with the positive rake face 2A, the flat rake face 2B is curved so as to put a dent in the thickness direction as moving toward the inside of the rake face 2.

On the other hand, in the present embodiment, when seen in a side view facing the flank face 3, the cutting edge 5 is curved so as to put a dent toward the thickness direction as moving toward the second region B from the first region A in the third region C. As compared with a case where, for example, the cutting edge 5 is as a whole disposed on a flat plane perpendicular to the thickness direction, a cutting edge inclination can be set so as to be great to the side of a positive angle, thereby lowering the cutting force. As a result, together with the fact that the cutting edge 5 in the third region C is increased in rake angle θ3, the cutting edge 5 in the third region C is further improved in sharpness, thus making it possible to suppress the occurrence of burrs more reliably.

Moreover, chips generated on light cutting having a cutting boundary in the third region C collide with side faces of the protrusion streak 10 protruding inside thereof after passing through the positive rake face 2A of the rake face 2 to the flat rake face 2B and are separated and treated. However, in the present embodiment, from the contact point between the corner section 6 and the linear section 7 at the cutting edge 5 positioned in the third region C to a part where the rake angle θ2 on the side of the third region C in the second region B where a position of the thickness direction at the cutting edge 5 becomes lowest starts to be constant, the position of the thickness direction at the flat rake face 2B on a cross section orthogonal to the cutting edge 5 when seen in the planar view is inclined downward so as to be gradually lower along the cutting edge 5. Further, the depth of the flat rake face 2B in the thickness direction from the cutting edge 5 on the above described cross section is also gradually increased.

That is, at the part on the side of the third region C in the second region B where the depth of the flat rake face 2B from the cutting edge 5 is gradually increased, a pocket which houses chips can be reliably increased in capacity. Thus, according to the present embodiment, chips generated in particular from the vicinity of a cutting boundary positioned in the third region C can be smoothly guided into the large capacity pocket and duly treated without clogging or the like. Therefore, in the present embodiment, it is also possible to prevent such a situation that burrs easily occur due to clogging of chips generated in the vicinity of the cutting boundary.

In the present embodiment, the insert main body 1 is made symmetrical with respect to the bisector Q of the corner section 6 and available in what is called a free-type cutting insert which can be attached to a holder of a right-handed indexable tool and also to a holder of a left-handed indexable tool. It is acceptable that the first region A, the second region B and the third region C including the third region C of which the rake angle θ is made greater are set for the cutting edge 5 which covers an area from one end of the corner section 6 which cuts into a workpiece to the linear section 7 at least facing to a feed direction. Therefore, the present invention is also applicable in what is called a handed cutting insert in which such first region A, the second region B and the third region C are not set to the cutting edge 5 extending from the other end of the corner section 6, in contrast to the above description.

EXAMPLES

Next, a range in which the third region C is positioned will be demonstrated for its effect by referring to an example. In the present example, six types of cutting inserts were manufactured according to the above described embodiment in which changing a range where the third region C was positioned in a direction from the tangent line J orthogonal to the extension line I of the linear section 7 to the corner section 6 and in contact with the corner section 6 and along the extension line I. These cutting inserts are referred to as examples 1 to 6.

In these cutting inserts of the examples 1 to 6, the model number was CNMG120408, the nominal radius of corner section 6 was 0.8 (mm) and the actually measured radius R was 0.794 (mm). As described above, the rake angle θ3 of the cutting edge 5 in the third region C was 20°, the rake angles θ1, ∂2 in the first region A and the second region B were to be constant and each of which was 15°. Further, the insert main body 1 was made with a sintered hard alloy (type M30 according to JIS B 4053-1998), the surface of which was coated by a CVD method with about a 5 μm-thick composite layer prepared by coating $Al_2O_3$ on TiCN.

Next, the cutting inserts of these examples 1 to 6 were used to lightly cut a workpiece (stainless steel) by turning an outer diameter. Comparison was made for the occurrence of burrs and fracturing resistance of each cutting edge at that time. The results and overall evaluation are shown in Table 1 together with ranges of the examples 1 to 6 in which the third region C was positioned.

TABLE 1

|  | Range of third region (mm) | Evaluation of occurrence of burrs | Evaluation of fracturing resistance | Overall evaluation |
| --- | --- | --- | --- | --- |
| Example 1 | 0.3-1.2 | EX | FA | FA |
| Example 2 | 0.3-1.5 | EX | FA | FA |
| Example 3 | 0.6-1.2 | EX | EX | EX |
| Example 4 | 0.6-1.5 | EX | FA | FA |
| Example 5 | 0.9-1.2 | FA | EX | FA |
| Example 6 | 0.9-1.5 | FA | EX | FA |

Further, the workpiece was a round bar made with SUS 304 (hardness of 169HB) and subjected to wet cutting by using cutting fluid (A3 type 1, JIS K 2241: 2000). When the occurrence of burrs was compared, the workpiece with an outer diameter of 57.6 mm was subjected to continuous cutting over a distance of 0.10 m in a rotation-axis direction of the workpiece under cutting conditions that the depth of cut was 1.0 mm, the feed rate was 0.1 mm/rev and the cutting speed was 150 m/min.

Further, when the fracturing resistance was compared, harder conditions were applied. Specifically, one 10 mm-wide flute was formed on an outer circumference of the workpiece with an outer diameter of 44.8 mm in the rotation-axis direction of the workpiece so as to cause interrupted cutting. The workpiece was cut under cutting conditions that the depth of cut was 1.5 mm, the feed rate was 0.2 min/rev and the cutting speed was 150 m/min over a distance of 0.10 m in the rotation-axis direction of the workpiece.

Still further, evaluation was made under the following criteria. Regarding the occurrence of burrs, a case where no occurrence of burrs was visually confirmed was evaluated "EX (excellent)" and a case where partial occurrence of burrs was confirmed was evaluated "FA (fair)." Further, regarding the fracturing resistance, a case where no chipping was found on cutting was evaluated "EX (excellent)" and a case where chipping was found but slight in extent and the workpiece was allowed to be cut up to the above described cutting length was evaluated "FA (fair)". Overall evaluation was made based on a lower evaluation among the above described evaluation results.

With reference to the results of Table 1, regarding the occurrence of burrs, partial occurrence of burrs was found in the examples 5 and 6 in which the border D between the first region A and the third region C was close to a cutting boundary, and no continuous occurrence of burrs was found. Further, no occurrence of burrs was confirmed in the examples 1 to 4 other than these examples.

On the other hand, regarding the fracturing resistance, there was found no chipping or fracturing which resulted in cutting failure. However, slight chipping was found on confirmation after completion of cutting in the examples 1, 2 and 4 in which a range of the third region C having a greater rake angle θ3 was 0.7 mm or more which was longer than ¾ of the radius R (mm) of the corner section 6. In contrast, no chipping was found in the examples 3, 5, and 6 in which the range of the third region C was 0.6 mm or less which was ¾ of the radius R (mm) of the corner section 6. According to the overall evaluation, the example 3 was evaluated highest in which the third region C was in a range of R×¾ to R×3/2 (mm) with respect to the radius R (mm) of the corner section.

INDUSTRIAL APPLICABILITY

The present invention relates to a cutting insert which is provided with an insert main body having a rake face and a flank face and a cutting edge formed at a ridge section between the rake face and the flank face in the insert main body.

According to the cutting insert of the present invention, on light cutting of a difficult-to-cut material such as stainless steel, the cutting edge was prevented from fracturing and chipping and also improved in sharpness at a cutting boundary to suppress the occurrence of burrs, thus making it possible to avoid abnormal wear and perform an efficient turning process.

DESCRIPTION OF REFERENCE NUMERALS

1: insert main body
2: rake face
2A: positive rake face
2B: flat rake face
3: flank face 5: cutting edge
6: corner section
7: linear section
A: first region
B: second region
C: third region
D: border between third region C and first region A
E: border between third region C and second region B
Q: bisector of corner section 6
I: extension line of linear section 7 to corner section 6
J: tangent line orthogonal to extension line I and in contact with corner section 6
θ: rake angle of positive rake face 2A
θ1: rake angle in first region A
θ2: rake angle in second region B
θ3: rake angle in third region C

The invention claimed is:

1. A cutting insert comprising:
an insert main body having a top and a bottom surrounded by sides, each side being a flank face of the insert, and a rake face on the top of each of the sides; and
a cutting edge which is formed between the rake face and the flank face in the insert main body and provided with a corner section which forms a convex arc shape when seen in a planar view from a direction facing the rake face and a linear section which is in contact with the corner section at least at one end of the corner section and extends linearly, wherein
the cutting edge is provided with a first region along the corner section when seen in the planar view, a second region along the linear section and a third region positioned between the first region and the second region, and
a rake angle of the cutting edge in the third region is greater than rake angles of the cutting edges in the first region and the second region.

2. The cutting insert according to claim 1, wherein
the rake angle of the cutting edge gradually decreases from borders of the third region, which are between the third region and the first region and between the third region and the second region, toward the first and the second regions along the respective cutting edges in the first and the second regions,
the border between the third region and the first region is positioned in a range of R×3/8 to R×3/4 (mm) with respect to the radius R (mm) of the corner section from a tangent line which is orthogonal to an extension line of the linear section to the corner section and in contact with the corner section, along the extension line, when seen in the planar view, and
the border between the third region and the second region is positioned in a range of R×3/2 to R×15/8 (mm) with respect to the radius R (mm) of the corner section from the tangent line, along the extension line, when seen in the planar view.

3. The cutting insert according to claim 2, wherein
the third region is positioned in a range of R×3/4 to R×3/2 (mm) with respect to the radius R (mm) of the corner section from the tangent line orthogonal to the extension line of the linear section to the corner section and in contact with the corner section, along the extension line, when seen in the planar view.

4. The cutting insert according to claim 1, wherein
the rake face comprises:
a positive rake face disposed adjacent to the cutting edge and having the rake angle; and
a flat rake face disposed inside the positive rake face in the cutting insert and the rake angle of which is smaller than that of the positive rake face, and
wherein when seen in the planar view, the width of the positive rake face in the third region is the smallest of the regions, and the width is defined in a direction orthogonal to the cutting edge.

5. The cutting insert according claim 1, wherein
the cutting edge included in the third region is curved between the first and second regions so as to put a dent in the rake face when seen in a side view facing the flank face.

6. The cutting insert according to claim 2, wherein
the rake face comprises:
a positive rake face disposed adjacent to the cutting edge and having the rake angle; and
a flat rake face disposed inside the positive rake face in the cutting insert and the rake angle of which is smaller than that of the positive rake face, and
wherein when seen in the planar view, the width of the positive rake face in the third region is the smallest of the regions, and the width is defined in a direction orthogonal to the cutting edge.

7. The cutting insert according to claim 3, wherein
the rake face comprises:
a positive rake face disposed adjacent to the cutting edge and having the rake angle; and
a flat rake face disposed inside the positive rake face in the cutting insert and the rake angle of which is smaller than that of the positive rake face, and
wherein when seen in the planar view, the width of the positive rake face in the third region is the smallest of the regions, and the width is defined in a direction orthogonal to the cutting edge.

8. The cutting insert according claim 2, wherein
the cutting edge included in the third region is curved between the first and second regions so as to put a dent in the rake face when seen in a side view facing the flank face.

9. The cutting insert according claim 3, wherein
the cutting edge included in the third region is curved between the first and second regions so as to put a dent in the rake face when seen in a side view facing the flank face.

10. The cutting insert according claim 4, wherein
the cutting edge included in the third region is curved between the first and second regions so as to put a dent in the rake face when seen in a side view facing the flank face.

11. The cutting insert according claim 6, wherein
the cutting edge included in the third region is curved between the first and second regions so as to put a dent in the rake face when seen in a side view facing the flank face.

12. The cutting insert according claim 7, wherein
the cutting edge included in the third region is curved between the first and second regions so as to put a dent in the rake face when seen in a side view facing the flank face.

* * * * *